United States Patent [19]

Weimer et al.

[11] Patent Number: 4,627,680
[45] Date of Patent: Dec. 9, 1986

[54] BRIDGING JOINT FOR ELECTRIC POWER BUSWAY

[75] Inventors: Charles L. Weimer, Patterson Heights; Barry R. Richards, Beaver, both of Pa.

[73] Assignee: Westinghouse Electric Corp., Pittsburgh, Pa.

[21] Appl. No.: 731,698

[22] Filed: May 8, 1985

[51] Int. Cl.⁴ .......................... H01R 11/00
[52] U.S. Cl. ................. 339/22 B; 339/22 R
[58] Field of Search ............... 339/20, 21 R, 22 R, 339/22 B, 24, 92 R, 92 M; 174/88 B

[56] References Cited

U.S. PATENT DOCUMENTS

| Re. 26,310 | 11/1967 | Moodie et al. | 174/68 |
|---|---|---|---|
| 3,180,924 | 4/1965 | Rowe | 174/88 |
| 3,339,009 | 8/1967 | Davis et al. | 174/72 |
| 3,365,537 | 1/1968 | Fehr, Jr. et al. | 174/88 |
| 3,376,377 | 4/1968 | Fehr, Jr. | 174/72 |
| 3,384,854 | 5/1968 | Jorgensen et al. | 174/88 B |
| 3,462,541 | 8/1969 | Davis et al. | 174/88 |
| 3,519,736 | 7/1970 | Fouse et al. | 174/88 |
| 3,566,331 | 2/1971 | Stanback et al. | 339/22 |
| 3,786,394 | 1/1974 | Koenig et al. | 339/22 B |
| 3,818,417 | 6/1974 | Koenig et al. | 339/22 B |
| 3,909,098 | 9/1975 | Reed et al. | 339/22 B |
| 4,009,920 | 3/1977 | Hicks, Jr. et al. | 339/22 B |
| 4,097,103 | 6/1978 | Krause | 339/22 B |
| 4,146,285 | 3/1979 | Cook | 174/88 B |
| 4,174,143 | 11/1979 | Hicks, Jr. et al. | 339/22 B |
| 4,272,646 | 6/1981 | Carlson | 174/88 B |

Primary Examiner—John McQuade
Attorney, Agent, or Firm—L. P. Johns

[57] ABSTRACT

A busway joint construction for electrically connecting and disconnecting busway sections of bus bars and characterized by a detachable joint assembly having pairs of plates extending between longitudinally spaced bus bars; one plate being an electrical conductor; the other plate being a non-conductor and having integral transversely extending spacers for maintaining the conductor plates of adjacent bus bars in spaced relation to facilitate insertion of the joint assembly; and the spacers including support surfaces for the electrical conductor.

10 Claims, 9 Drawing Figures

BRIDGING JOINT FOR ELECTRIC POWER BUSWAY

BACKGROUND OF THE INVENTION

1. Field of the Invention

This invention relates to bridging joints for electrical busways and, more particularly, it pertains to a removable joint assembly for connecting spaced ends of bus bars within adjacent sections of such busways.

2. Description of the Prior Art

Low voltage, high current power is readily transmitted within a building from a power source to load apparatus by an electrical busway system. Generally, such a system includes elongated sections of tubular bus duct connected end-to-end so that a plurality of bus bars may be interconnected.

The present type of single bolt joint on a busway system is constructed so that bus ends overlap. Joint pressure on the bus bars and insulating spacers is applied by an insulated steel bolt. This type of joint involves disadvantages including difficulty in removing a section of duct from the middle of a busway run. There is also a problem of isolating parts of a bus duct run because a section of bus duct must be removed. Moreover, it is difficult or impossible to add power takeoffs to an existing run of bus ducts where the bus bar ends overlap.

SUMMARY OF THE INVENTION

In accordance with this invention a busway joint construction for connecting busway sections together may comprise a plurality of elongated bus bars supported within each section with end portions of each bus bar of one section spaced from the end portions of a corresponding bus bar in an adjacent section; detachable joint means for electrically connecting the corresponding end portions and including a joint assembly of spaced plates including a conductor plate and a dielectric plate for each pair of corresponding bus bars; the plates having aligned apertures and surrounding facing surfaces for clamping engagement with the end portions of corresponding bus bars; the dielectric plate having a collar around the aperture for holding the conductor plate and dielectric plate in spaced relation for facilitating insertion of the joint assembly between the spaced bus bars; each collar including a support surface for supporting the conductor plate at a clearance space slightly less than the thickness of the bus bar end portions; each collar also comprising a peripheral surface substantially perpendicular to the facing surfaces and having a top surface spaced from the plate facing surface and the support surface being located between the top surface and facing sides; and the portion of the peripheral surface between the top and support surfaces being inclined outwardly toward the top surface, so as to enable location of the conductor plates on the support surfaces.

The busway joint assembly of this invention provides a self-contained splice unit that is easily removable as a unit to provide for easy removal of a section of a duct, isolation between parts of a busway run, a method for taking electrical measurements on parts of a busway run, and insulation of a power takeoff unit at the joint of a run of installed busway.

DESCRIPTION OF THE PREFERRED EMBODIMENT

Figure 1:
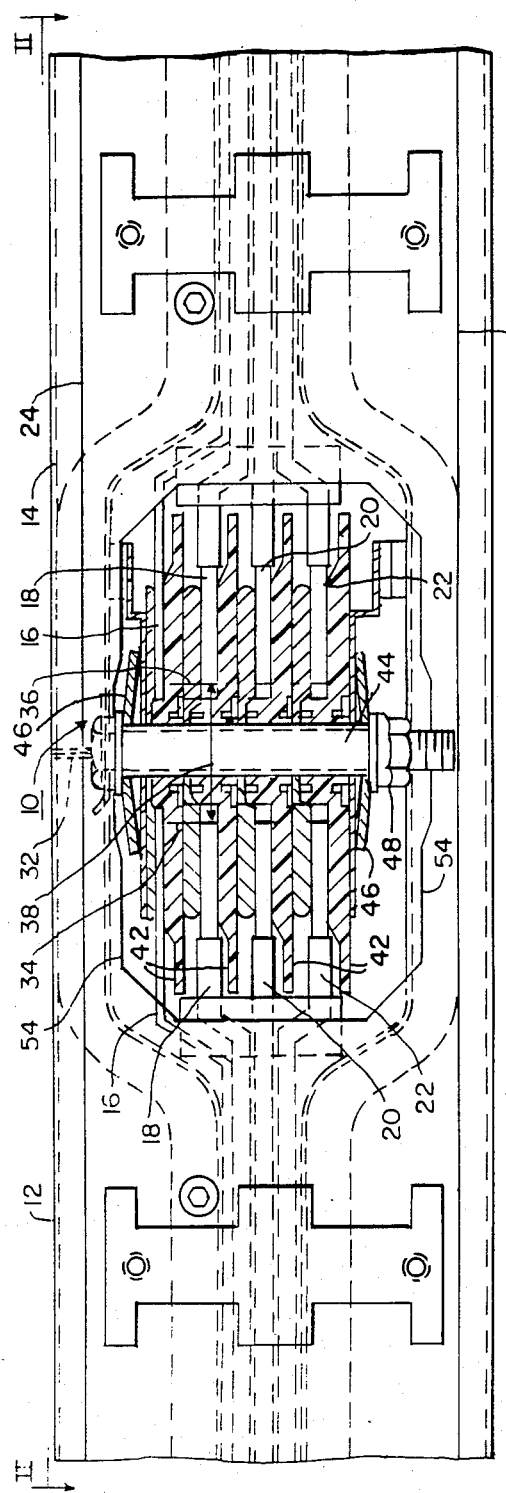
FIG. 1 is a vertical sectional view through the end portions of a pair of bus ducts, shown in joint assembly in place.
Figure 3:
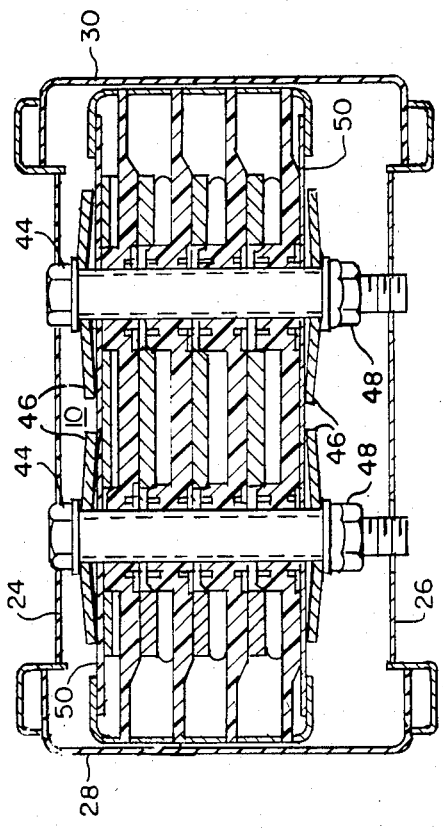
FIG. 3 is a vertical sectional view taken on the line III—III of FIG. 2.
Figure 2:
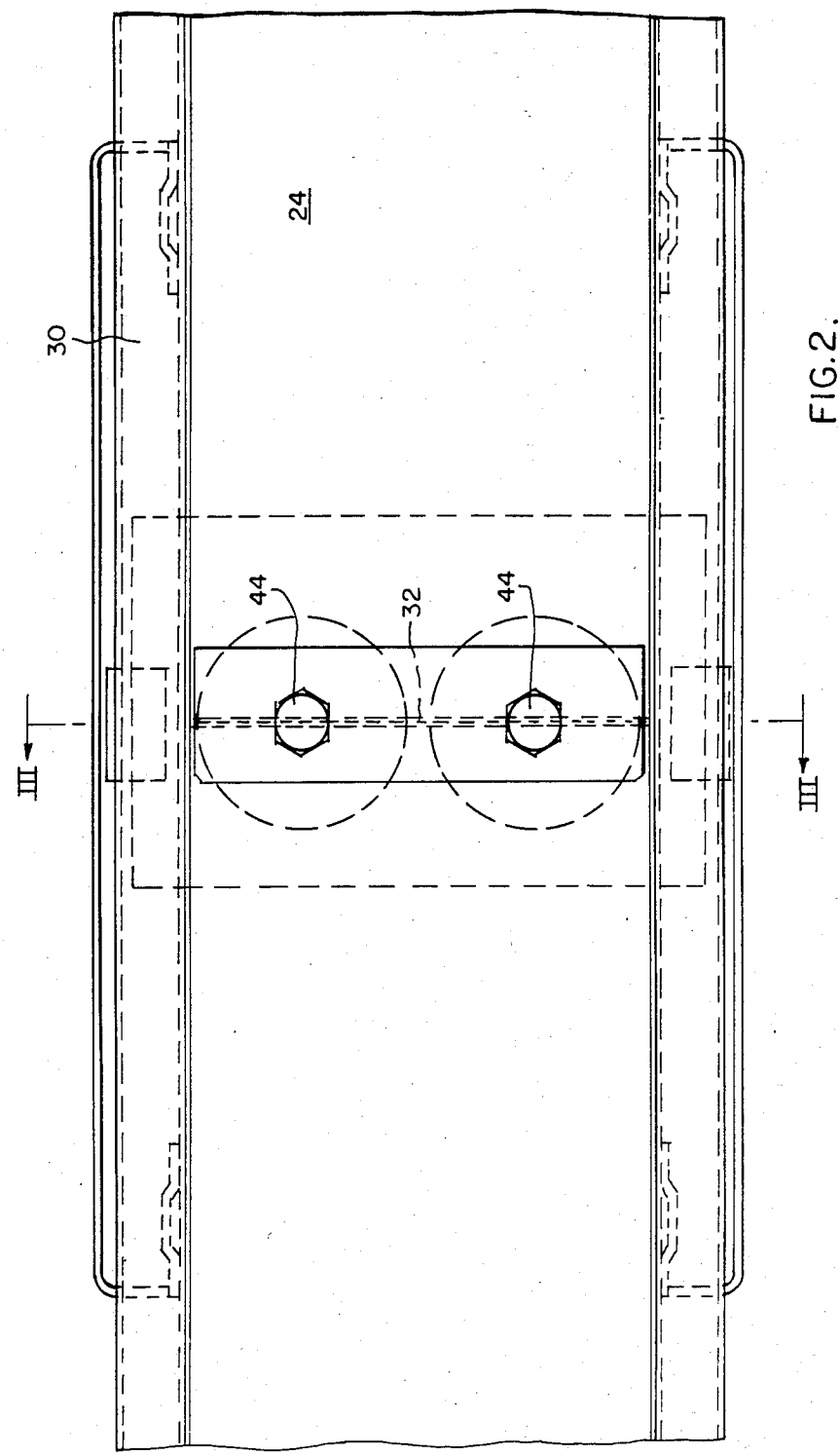
FIG. 2 is a plan view taken on the line II—II of FIG. 1.

In FIG. 1, a joint assembly 10 is shown installed between two similar bus duct sections 12, 14. The bus duct sections 12, 14 are identical and include a plurality of flat elongated bus bars 16, 18, 10, and 22 extending through an elongated sheet metal housing having top and bottom walls 24, 26 as well as opposite side walls 28, 30 (FIG. 3).

As shown in FIG. 1, the ends of the housings of the bus ducts 12, 14 abut at plane 32 and the ends of the several bus bars 16-22 terminate at spaced planes indicated by lines 34, 36, respectively, which are recessed inwardly from the second abutment 32. Thus, the ends of the bus bars in the bus ducts 12, 14 are spaced from each other by a distance indicated by the arrow 38. Electrical connection between the spaced bus bars, or the bus duct sections 12, 14, is provided by the joint assembly 10.

As shown in FIGS. 1-4, the joint assembly 10 comprises a plurality of conductors or plates 40, a plurality of insulators or plates 42 and a pair of assembly bolts 44. It is noted that although the two bolts are shown, one or more bolts may be provided as required. The joint assembly may also include Belleville washers 46. Aligned apertures through the several parts 40, 42, 46 are retained in alignment by the bolts 44 extending therethrough. A tightening nut 48 is provided at the threaded end of the bolt for providing and maintaining a clamping relationship between the several conductors 40, insulators 42 and washers 46 as well as the end portions of the bus bars 16-22.

Figure 4:
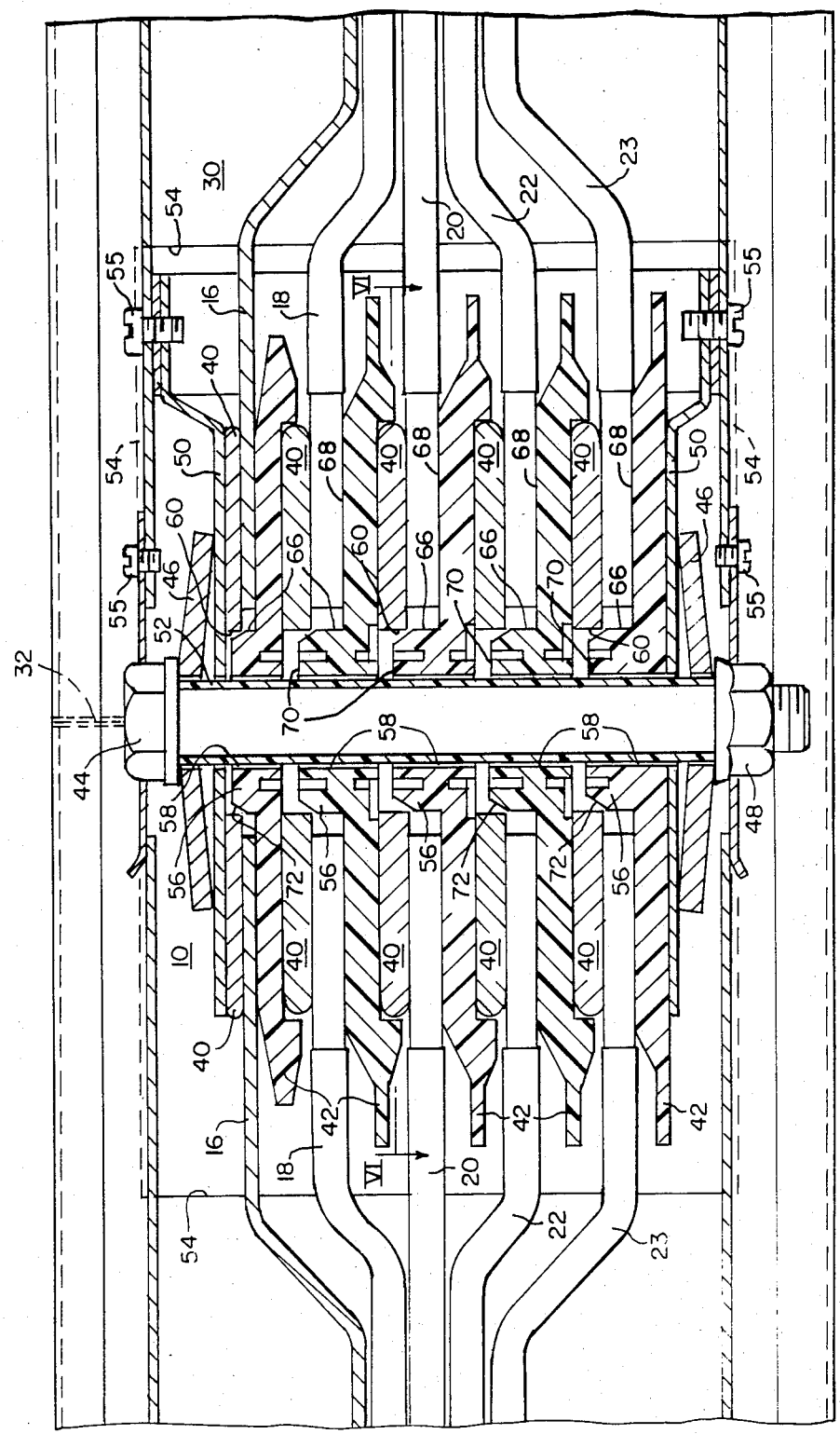
FIG. 4 is an enlarged vertical sectional view showing the joint assembly installed between spaced bus bars.

As shown in FIG. 4, the bus bars 18, 20, 22 conduct three phases of the current supplied and the bus bar 16 represents a ground conductor. An additional bus bar 23 is a neutral conductor which is not shown in FIGS. 1, 3. The assembly of the parts 40, 42, 44, 46, 48 (FIG. 5) is retained together with a sheet metal housing 50. The bolts 44 are provided with insulator sleeves 52. An access opening 54 in the side wall 30 (FIGS. 1, 4) is provided for lateral insertion and removal of the joint assembly 10 when necessary. In the installed position (FIG. 4), the joint assembly 10 may be secured in place by screws 55 between the duct walls and the housing 50.

As shown in FIGS. 4–8, the several insulators 42 comprise collars 56 which are disposed around apertures 58 of the insulators. Inasmuch as the collars 56 around each bolts 44 (FIG. 3) are identical, only one of the collars is described. The collar 56 is substantially rectangular with diagonal corners 62. Similarly, the aperture 60 of the conductors 40 are substantially rectangular with diagonal corners 64. Each collar 56 (FIG. 4) includes a peripheral surface 66 which extends substantially perpendicular to the surrounding surface 68 of the insulator 42. Each collar comprises a top surface 70 and an inclined or beveled surface 72 extends between the top surface 70 and the peripheral surface 66.

Figure 5:
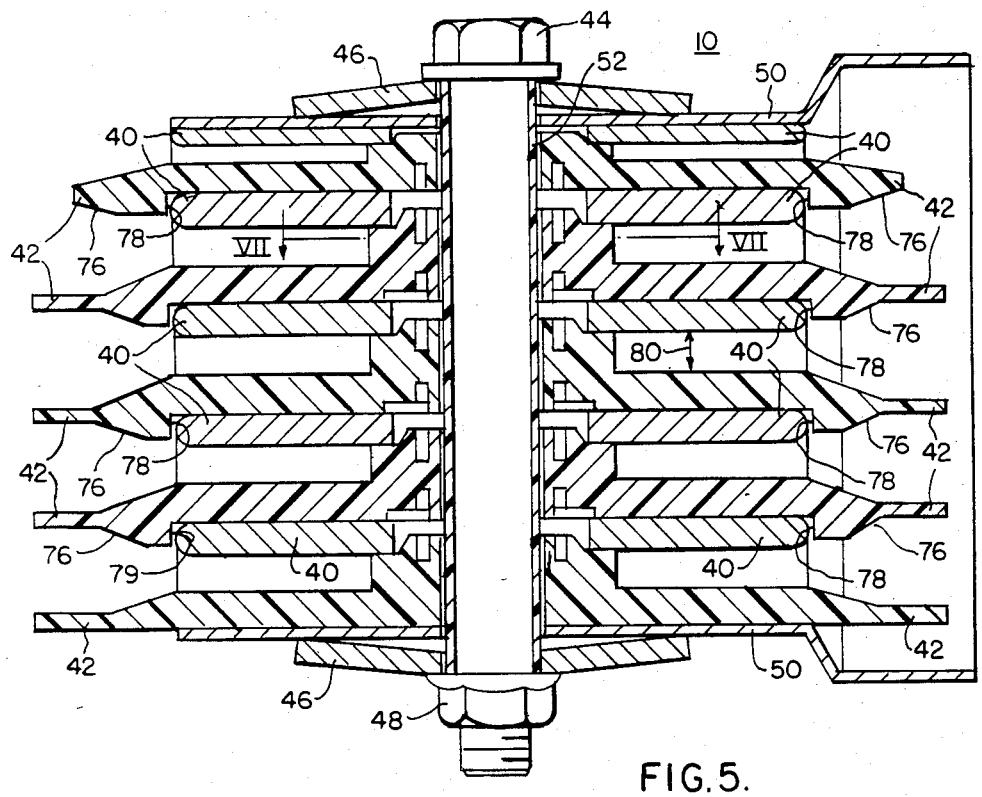
FIG. 5 is a vertical sectional view through the joint assembly removed from the busway taken on the line V—V of FIG. 6.
Figure 6:
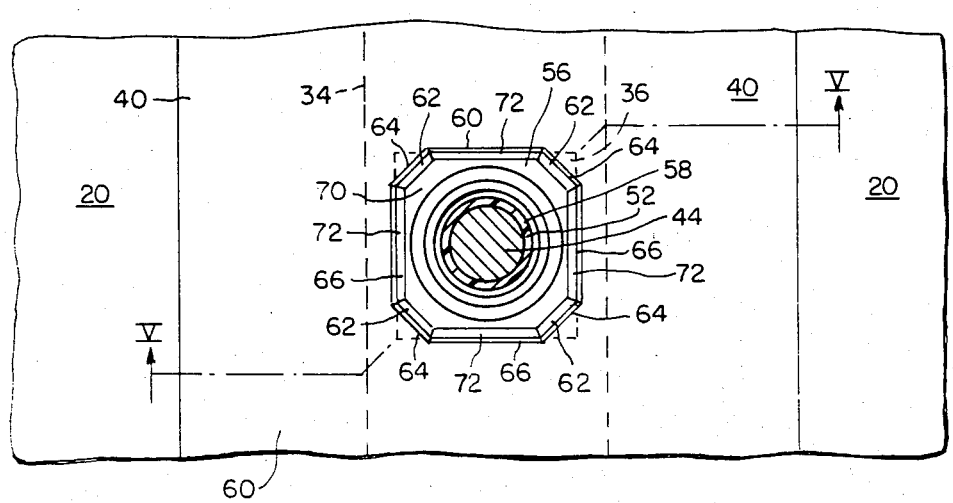
FIG. 6 is a fragmentary, sectional view taken on the line VI—VI of FIG. 4.
Figure 8:
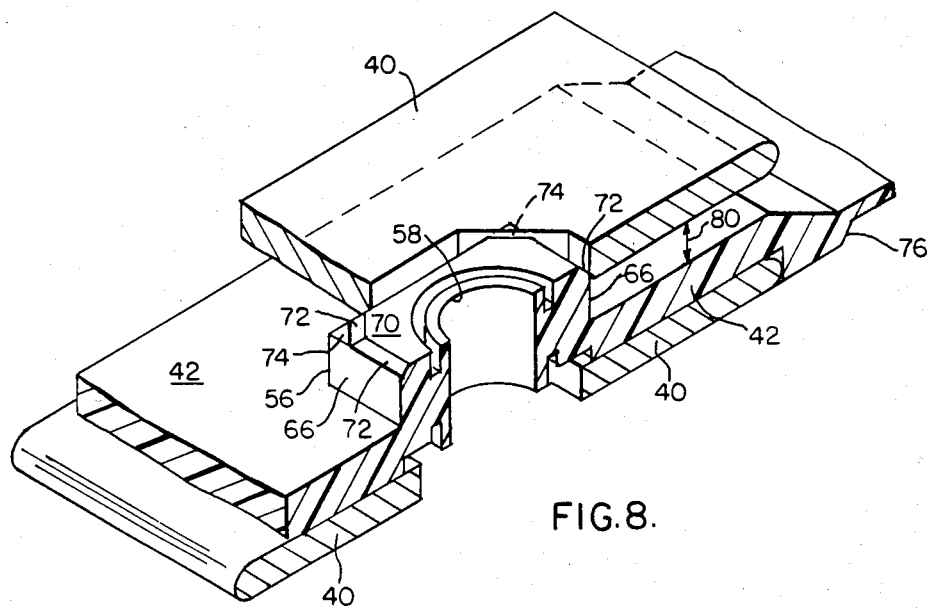
FIG. 8 is a fragmentary isometric view showing the assembly of the conductor and insulator plates.
Figure 7:
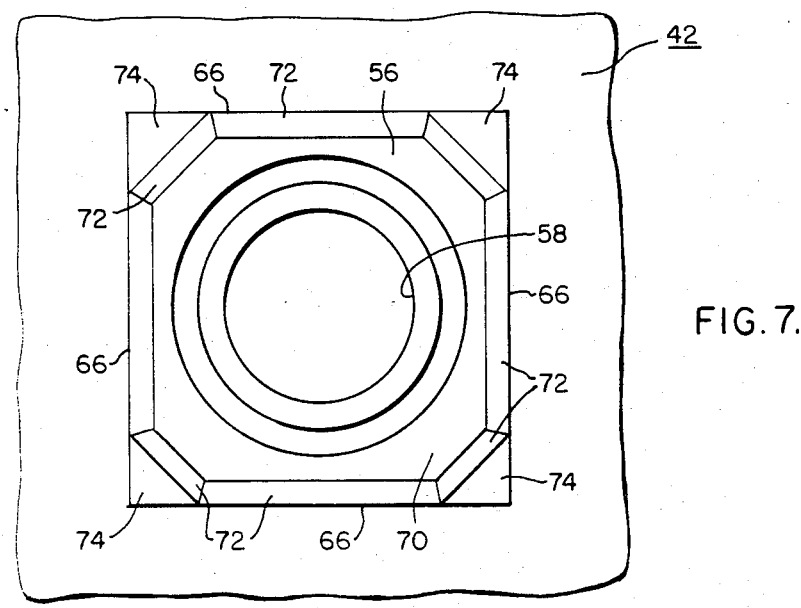
FIG. 7 is a fragmentary horizontal view taken on the line VII—VII of FIG. 5.

In accordance with this invention (FIGS. 6, 7, 8), the collars 56 include support surfaces 74 formed by intersections of the peripheral surfaces 66 below the inclined surfaces 72, whereby the conductors 40 are supported when the joint assembly is removed from the connecting position (FIG. 4) to the removed position (FIG. 5). Support surfaces 74 are provided at each of the four corners of the collar 56.

More particularly, when the joint assembly 10 is not installed for use between adjacent busway sections, such as shown in FIG. 5, the several conductors 40 are supported on the corresponding support surfaces 74 of the insulators 42. Thus, a space is maintained between the conductors and the next lower insulator. In addition, each insulator is a splice plate in that it is provided with a tapered edge 76. Moreover, each insulator undersurface includes a recess 78 in which the conductors 40 are located. Accordingly, these features including the clearance space 80 between the plates 40, 42, the tapered edge 76, and the recess 78 cooperate to facilitate insertion of the joint assembly 10 into position (FIG. 4) without undue interference between the bus bars 16-23 and the conductors 40.

Inasmuch as the bus bars 16-23 have a thickness greater than the distance between the surface of the insulator 42 and the support surfaces 74, the conductors 40 are lifted off the surface 74. Thus, the joint assembly 10 may be clamped tightly in place to provide good electrical contact between the conductors 40 and the bus bars by tightening the nuts 48 on the bolts 44.

Figure 9:
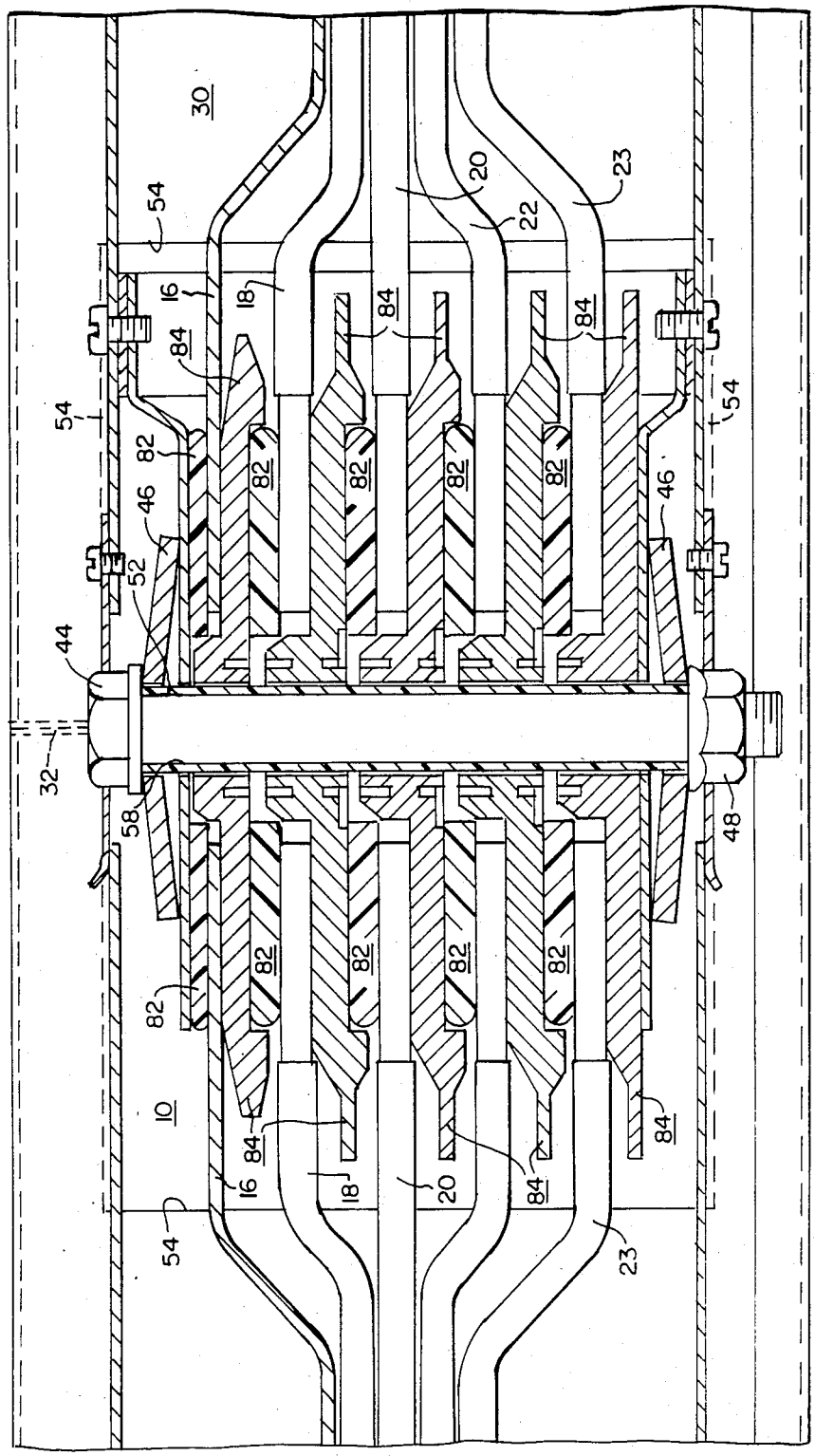
FIG. 9 is a vertical sectional view of another embodiment of the invention.

In another embodiment of the invention as shown in FIG. 9, similar numerals refer to similar parts. Under some conditions, it may be desirable to reverse the character of the plates by providing insulator plates 82 and conductor plates 84 having configurations reversely identical to the conductors 40 and insulators 42 of the embodiment of the invention shown in FIG. 4.

In conclusion, the busway bridging joint of this invention is a self-contained unit that electrically connects two sections of a busway together. But it is removable so that two sections of the busway can be isolated from each other, or a power takeoff unit may be inserted instead of the joint. Finally, removal of a bridging joint enables electrical measurements to be made on part of the busway run, or a section of the busway can be easily removed where necessary.

What is claimed is:

1. A busway joint construction for electrically connecting busway sections together, comprising:
   a pair of busway sections;
   at least one elongated bus bar supported in each section with the end portion of one bus bar being spaced from the end portion of the other bus bar;
   joint means for electrically connecting the spaced end portions and including a joint assembly of spaced plates, one plate being a conductor and the other plate being an electrical insulator;
   the plates having aligned apertures and surrounding facing surfaces for clamping contact with the end portions of both bus bars;
   one of the plates having a spacer collar around the aperture which collar has a support surface engaging the facing surface of the other plate; and
   clamping means extending through the aligned apertures for clamping the bus bar portions in good electrical contact with the conductor plate.

2. The busway joint construction of claim 1 in which the spacer collar has a height less than the thickness of the bus bar so as to maintain a clearance space between the plates for facilitating insertion of the bus bars.

3. The busway joint construction of claim 1 in which at least one of the plates is a splice plate for enabling insertion of the bus bar portions between the plates.

4. The busway joint construction of claim 3 in which the collar comprises a peripheral surface substantially perpendicular to the facing surfaces and comprising a top surface spaced from the plate facing surface, and the support surface being between the top and facing surfaces.

5. The busway joint construction of claim 4 in which a beveled surface is disposed between the peripheral surface and the top surface and is inclined inwardly toward the top surface.

6. The busway joint construction of claim 5 in which the plate having the spacer collar is an electrical insulator.

7. A busway joint construction for electrically connecting busway sections together, comprising:
   a pair of busway sections;
   a plurality of elongated bus bars supported in each section with the end portion of each bus bar of one section being spaced from the end portion of a corresponding bus bar in the other section;
   detachable joint means for electrically connecting the corresponding end portions and including a joint assembly of spaced plates including a conductor plate and a dielectric plate for each pair of corresponding bus bars;
   the plates having aligned apertures and surrounding facing surfaces for clamping engagement with the end portions of corresponding bus bars;
   one of the conductor and dielectric plates having a spacer collar around the aperture which collar has a support surface engaging the facing surface of the other conductor and dielectric plates; and
   clamping means extending through the aligned apertures for clamping the bus bar portions in good electrical contact with the conductor plate.

8. The busway joint construction of claim 7 in which the plate having the collar is a dielectric and is a splice plate for facilitating insertion of the detachable joint means between the spaced bus bars.

9. The busway joint construction of claim 8 on which the collar of the one plate includes support surface means for supporting the other plate at a clearance space slightly less than the thickness of the bus bar portions and the other plates being yieldingly movable to enable insertion of the bus bar portion.

10. The busway construction of claim 9 in which the plate having the spacer collar is an electrical insulator.

* * * * *